United States Patent
Mine

(10) Patent No.: US 6,243,338 B1
(45) Date of Patent: Jun. 5, 2001

(54) RECORDING APPARATUS, RECORDING METHOD, AND DISC-SHAPED RECORD MEDIUM

(75) Inventor: Norichika Mine, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/149,212

(22) Filed: Sep. 8, 1998

(30) Foreign Application Priority Data

Sep. 16, 1997 (JP) .................................................. 9-250712

(51) Int. Cl.⁷ ........................................................ G11B 7/00
(52) U.S. Cl. ......................................... 369/47.1; 369/53.41
(58) Field of Search .................................. 369/47, 48, 49, 369/50, 54, 58, 59, 32, 47.1, 47.14, 47.15, 53.1, 53.11, 53.2, 53.31, 53.41

(56) References Cited

U.S. PATENT DOCUMENTS 5,271,018 * 12/1993 Chan ................................... 369/32 X
5,537,636 * 7/1996 Uchida et al. ..................... 369/59 X

* cited by examiner

*Primary Examiner*—Muhammad Edun
(74) *Attorney, Agent, or Firm*—Oblon, Spivak, McClelland, Maier & Neustadt, P.C.

(57) ABSTRACT

A WBBM is recorded in a lead-in area of a rewritable disc. The WBBM is a bit map that represents whether each block that is a record/reproduction data unit is a recorded block or a non-recorded block. A finalizing process for recording dummy data in the vicinity of a recorded block is performed so that a read-only disc drive can seek a block and a servo operation of the drive can be stable. At this point, with reference to the WBBM, the efficiency of the process can be improved. When a plurality of WBBMs are ring-structured and the WBBMs are successively updated, the write operation can be prevented from being concentrated to the same area. In addition, a destroyed WBBM due to a power failure or the like can be restored. The value of an update counter represents the latest WBBM.

15 Claims, 16 Drawing Sheets

RECORDING APPARATUS, RECORDING METHOD, AND DISC-SHAPED RECORD MEDIUM

BACKGROUND OF THE INVENTION

1. Field of the Invention

The present invention relates to a recording apparatus for use with an optical disc or the like, a recording method thereof, and a disc-shaped recording medium.

2. Description of the Related Art

Disc-shaped record mediums (for example, DVDs) can be categorized as rewritable mediums (DVD+RW) and read-only mediums (DVD-ROM) depending on their characteristics. Since their physical formats are similar, it is preferable to allow a DVD-ROM drive to reproduce data from a DVD+RW disc. There are differences between the DVD+RW drive and the DVD-ROM drive in a spindle servo signal and a method for obtaining a position signal (address) of a medium. The DVD+RW disc has a wobbling groove. The DVD+RW drive obtains a position signal from a reproduced signal of the wobbling groove. In contrast, the DVD-ROM disc does not have such a wobbling groove. The DVD-ROM drive obtains a position signal from a frame synchronous signal and an address signal reproduced from the DVD-ROM disc.

To allow the DVD-ROM drive to reproduce data from the DVD-RW disc, a frame synchronous signal and a position signal are placed in data of the DVD+RW disc. However, since the DVD+RW disc has a non-recorded portion before or after recorded data, it is difficult for the DVD-ROM drive to reproduce data from the DVD+RW disc. In reality, since the DVD-ROM drive cannot reproduce the frame synchronous signal from the DVD+RW disc, the DVD-ROM cannot stably operate the spindle servo and perform the seek operation for reading a desired sector from the DVD+RW disc.

The seek operation is performed in a combination of a coarse seek operation and a fine seek operation. In the coarse servo operation, many tracks are jumped at a time. On the other hand, in the fine servo operation, a desired sector is acquired in the vicinity of a target position. Due to the eccentricity of the disc, when the seek operation is performed in the fine servo operation, a deviation of several ten tracks to several hundred tracks normally takes place. If the jumped position is a non-recorded area, the target track cannot be acquired. Thus, when the seek operation is performed, data containing a frame synchronous signal and a position signal should have been recorded in the vicinity of the target sector.

Thus, to allow the DVD-ROM drive to reproduce data from the DVD+RW disc, dummy data should have been recorded before or after recorded data on the DVD+RW. To do that, a process referred to as a finalizing process is performed. The finalizing process can be performed in the following two methods.

As the first method, a file system is analyzed. Generally, a file system has a space bit map for allocating a user area. A UDF system that is often used for DVD discs has a space bit map and information that represents whether or not each entry of each file has been recorded. Thus, when the file system is analyzed, a position of user data (namely, a position to which dummy data should be written) can be obtained. This method is performed by an application program of a host computer.

As the second method, a blank area is detected. In this method, all blocks of the DVD+RW disc are read. When a block can be read, it is treated as a recorded block. On the other hand, when a block cannot be read, the hardware of the drive determines whether an RF signal is absent (namely, data has been recorded) or data that has been recorded cannot be reproduced. When the RF signal cannot be obtained, since data has not been recorded, dummy data is recorded. Even if the RF signal is obtained, when data cannot be read, the drive determines whether the relevant block is unchanged or dummy data is overwritten depending on the amount of an ECC error or the like.

The first method (for analyzing a file system for use) can be effectively performed as long as the number of directories/files is small. However, when the number of directories/files is as large as several thousands, it takes a long time to perform the process. Thus, this method is not effective. In the file system other than the UDF system, this method cannot be used because available information is limited to allocation information. In other words, depending on a file system for use, the feasibility of this method is restricted. On the other hand, the second method (for detecting a blank area) can be used regardless of a file system for use. However, since all blocks of the disc should be read, it takes a long time to perform the process.

Other than the above-described two methods, when a disc is formed, a certificating process may be required. In the certificating process, a certification pattern is recorded on the entire disc. By reproducing the data, it is determined whether or not there is a defect on the disc. Thus, when the certification pattern is recorded on the entire surface, since non-recorded areas are absent, the finalizing process is not required. However, since the storage capacity of the DVD+RW disc is large, it takes around one hour to perform the certificating process. Thus, since this method is not effective, it is improper to require the user to perform the certificating process.

OBJECTS AND SUMMARY OF THE INVENTION

It is therefore an object of the invention to provide a recording apparatus that allows the finalizing process to be quickly performed regardless of a file system for use, a recording method thereof, and a disc-shaped recording medium thereof.

According to a first aspect of the invention, there is provided a recording apparatus for use with a disc-shaped record medium having a user data area and a management area, comprising:

recording means for recording at least one bit map that represent whether or not each data unit for recording/reproducing has been recorded; and processing means for recording the bit map to the management area of the disc-shaped record medium, and referencing the bit map and adding a predetermined amount of data that contains at least one of servo information and position information to a non-recorded area in the vicinity of recorded data so as to allow a reproducing apparatus that reproduces data from a read-only disc-shaped medium and obtains at least one of the servo information and the position information from a reproduced signal to reproduce data from a rewritable disc-shaped record medium.

According to a second aspect of the invention, there is provided a recording method for use with a rewritable disc-shaped record medium having a user data area and a management area, comprising the steps of:

creating a bit map composed of bits that represent whether or not each record/reproduction data unit has been recorded;

recording the bit map to the management area of the disc-shaped record medium; and referencing the bit map and adding a predetermined amount of data that contains at least one of servo information and position information to a non-recorded area in the vicinity of recorded data so as to allow a reproducing apparatus that reproduces data from a read-only disc-shaped medium and obtains at least one of the servo information and the position information from a reproduced signal to reproduce data from a rewritable disc-shaped record medium.

According to a third aspect of the invention, there is provided a disc-shaped record medium having a first rewritable area for recording user data and a second rewritable area for recording management data, wherein at least one of servo information and position information is pre-recorded as wobbling information in a wobbling groove, and wherein the second rewritable area has a bit map that represents whether or not each data unit for recording/reproducing for the first rewritable area has been recorded.

A bit map that is a set of bits representing whether or not each block as record/reproduction data unit has been recorded is recorded in a management area of the disc. Thus, when the finalizing process is performed, finalization data (dummy data) can be recorded with reference to the bit map. Consequently, the finalizing process can be quickly performed regardless of a file system for use. In addition, the user is not requested to perform the certifying process.

The above, and other, objects, features and advantage of the present invention will become readily apparent from the following detailed description thereof which is to be read in connection with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Next, with reference to the accompanying drawings, an embodiment of the present invention will be described. In the embodiment, a phase change type disc is used as a rewritable optical disc. In reality, two discs whose diameters are 120 mm and whose thicknesses are 0.6 mm are adhered to form a rewritable optical disc. In addition, the rewritable optical disc has a wobbling groove. As will be described later, the wobbling groove is wobbled with a signal of which an address (a position signal) is wobbled. A clock signal for signal processing and an absolute address on the disc can be extracted from the reproduced signal of the wobbling groove.

In addition, the disc is rotated at CAV (Constant Angular Velocity). Data is recorded in a groove. In other words, a groove system is used. Data is recorded at CLD (Constant Linear Density) on the disc. The linear density is 0.35 $\mu$m/bit. A predetermined range of linear densities is designated. A rewritable area of the disc is divided into many zones. In each zone, a linear density is defined. This type of disc is referred to as a DVD+RW disc. However, it should be noted that the present invention is not limited to a DVD+RW disc. In other words, the present invention can be applied to optical discs such as a groove/land record type disc and a magnetic optical (MO) record disc.

Figure 1:
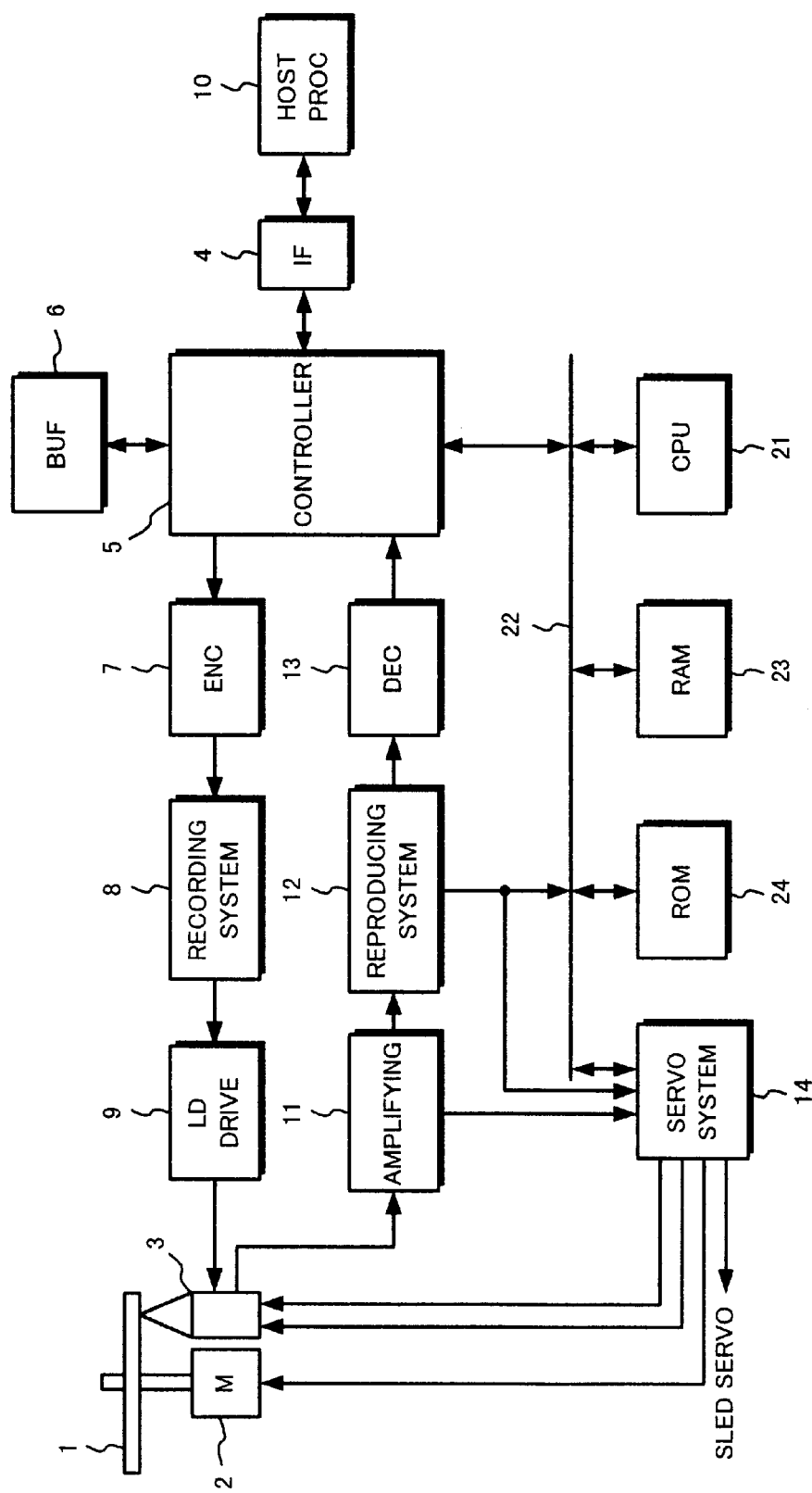
FIG. 1 is block diagram showing the structure of each area of a drive according to an embodiment of the invention.

Next, with reference to FIG. 1, the structure of a disc drive for use with a rewritable optical disc such as a DVD+RW disc will be described in brief. In FIG. 1, reference numeral 1 is a phase change type optical disc. The optical disc 1 is rotated at CAV by a spindle motor 2. An optical pickup 3 is disposed so as to record data on the optical disc 1 and to reproduce data therefrom.

Data of an external host processor 10 is supplied to the disc drive through an interface 4. A controller 5 is connected to the interface 4. A buffer memory 6 is connected to the controller 5. The buffer memory 6 stores write data or read data. Write data is supplied from the controller 5 to an encoder 7. The encoder 7 converts the write data into sector-structured data, encodes each ECC block that is composed of 16 sectors with an error correction code, and adds a frame synchronous signal and a linking section.

The frame-structured data is supplied to a recording system 8. The recording system 8 performs a digital modulating process and so forth. The recording system 8 supplies record data to a laser drive 9. The laser drive 9 generates a drive waveform corresponding to a predetermined level necessary for recording data to the optical disc 1. Output data of the laser drive 9 is supplied to the optical pickup 3.

The optical pickup 3 reproduces data on the optical disc 1. The reproduced data is detected by a photo detector. The detected signal is supplied to an amplifying circuit 11. An output signal of the amplifying circuit 11 is supplied to a reproducing system 12 and a servo system 14. The amplifying circuit 11 calculates the detected signal of the photo detector and generates an RF signal, a tracking error signal, and a focus error signal. The RF signal is supplied to a reproducing system 12. The tracking error signal and the focus error signal are supplied to a servo system 14.

The reproducing system 12 performs a digital demodulating process. In addition, the reproducing system 12 processes a reproduced signal of a wobbling groove and demodulates an address. The separated frame synchronous signal and the address are supplied to the servo system 14. The servo system 14 performs a tracking servo operation and a focus servo operation for the optical pickup 3. In addition, the servo system 14 performs a spindle servo operation and a sled servo operation for the optical pickup 3. In the sled servo operation, the servo system 14 moves the optical pickup 3 in the radius direction of the disc.

The reproduced data of the reproducing system 12 is supplied to a decoder 13. The decoder 13 decodes an error correction code (namely, corrects an error of the reproduced data), disassembles the reproduced data into sector-structured data, and performs another process. The reproduced data of the decoder 13 is supplied to the controller 5. Thereafter, the reproduced data is stored in the buffer memory 6. When a read command is received from the host processor 10, read data is sent to the host processor 10 through the interface 4.

To drive the entire operation of the disc drive, a CPU 21 is disposed. A RAM 23 and a ROM 24 are connected to the CPU 21 through a bus 22. The ROM 24 stores a program. A reproduced address of the reproducing system 12 is supplied to the bus 22. In addition, the controller 5 is connected to the bus 22.

Figure 2:
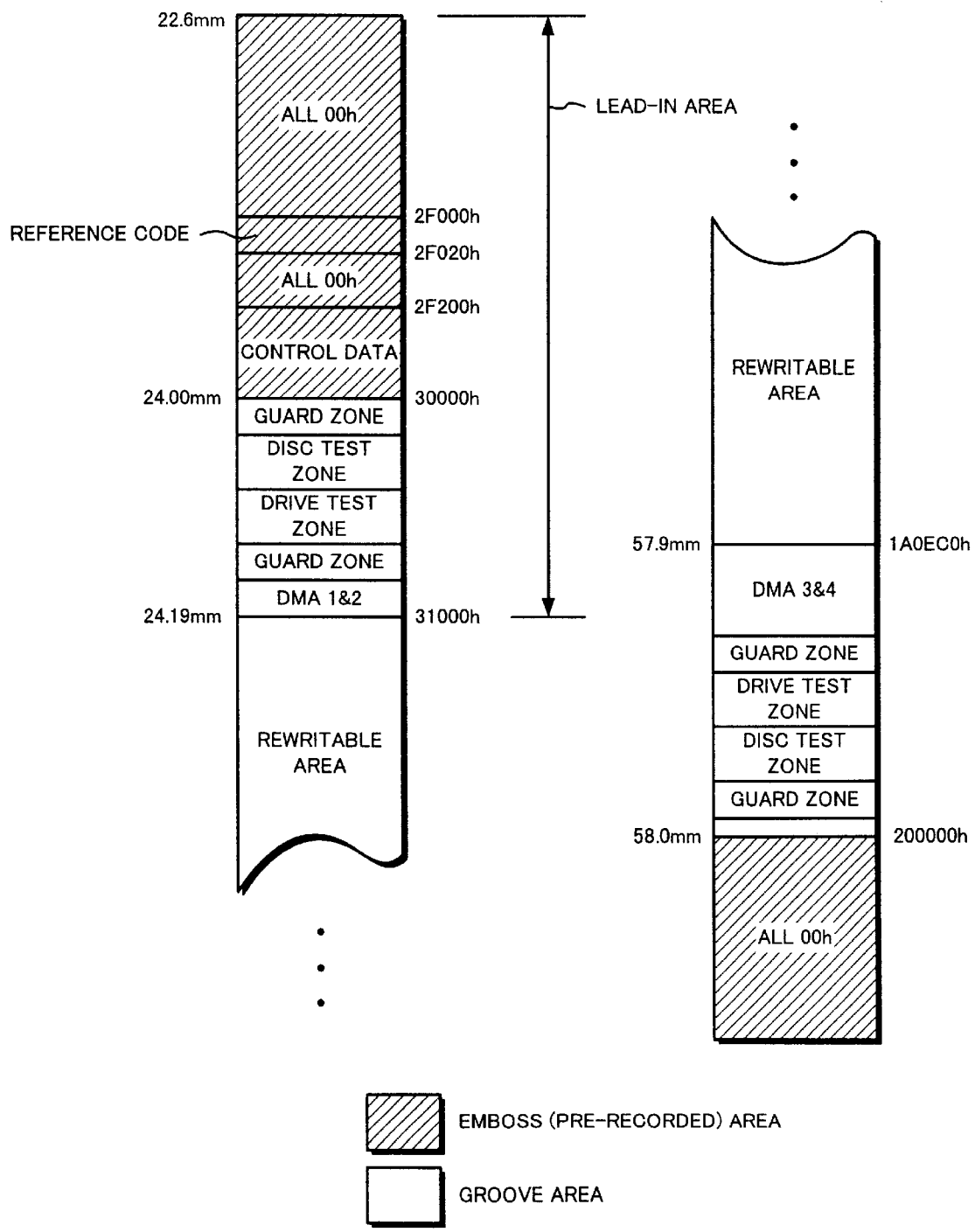
FIG. 2 is a schematic diagram showing the structure of each area of a disc-shaped record medium according to the invention.

Next, an example of the rewritable optical disc 1 will be described. FIG. 2 shows the structure of areas from the inner periphery side (lead-in side) to the outer periphery side (lead-out side) of the disc. In FIG. 2, the radius position and absolute address (in hexadecimal notation) of each area of the disc are denoted on the left side and the right side of the diagram.

Emboss pits are recorded in the hatched areas on the innermost periphery side (from radius position 22.6 mm to radius position 24.0 mm) and the outermost periphery side (after radius position 58.00 mm). In the emboss area (also referred to as ROM area), all "00h" data, a reference code for 2 ECC blocks (from absolute address "2F00h"), and 186 blocks of control data (from absolute address "2F200h") are recorded. An ECC block is a data unit that composes an error correction block. An error correction code parity is added to data of every 32 kbytes (=2 kbytes×16).

Control data and reference code are recorded when a master disc is cut. The control data and reference code are read-only pit data. The control data includes physical management information and so forth of the optical disc.

Areas other than the emboss area (namely, areas from radius position 24.0 mm to radius position 58.0 mm) are rewritable areas of which tracks are formed with grooves (namely, the groove area). In the groove area, a user area is from radius position 24.19 mm to radius position 57.9 mm (from absolute address "31000h" to absolute address "1A0EBFh").

In the rewritable areas on the inner periphery side and the outer periphery side of the user area, a guard zone, a disc test zone, a drive test zone, and a DMA (defect management area) are formed. The guard zone is formed so as to allow data written to the disc test zone and DMA to synchronize with a write clock. The disc test zone is formed so as to check the disc condition. The drive test zone is formed so as to check the condition of the recording/reproducing drive.

DMA1 and DMA2 are formed on the inner periphery side of the disc. DAM3 and DAM4 are formed on the outer periphery side of the disc. Same information is recorded in each of the DMA1 to DMA4. A detected result of a defect in the recordable area and information of a substitute sector are recorded in the DMA. Since the recording/reproducing operation is performed with reference to the contents of the DMA, a defective area can be skipped. The inner periphery areas of the rewritable area (other than the user area) and the emboss area on the innermost periphery side structure a lead-in area as a management area.

In the groove area other than the emboss area on the optical disc 1, tracks are pre-formed with wobbling grooves. The wobbling grooves represent absolute addresses. Thus, the recording/reproducing apparatus can obtain information of absolute addresses and so forth with reproduced signals of grooves.

Figure 3A:
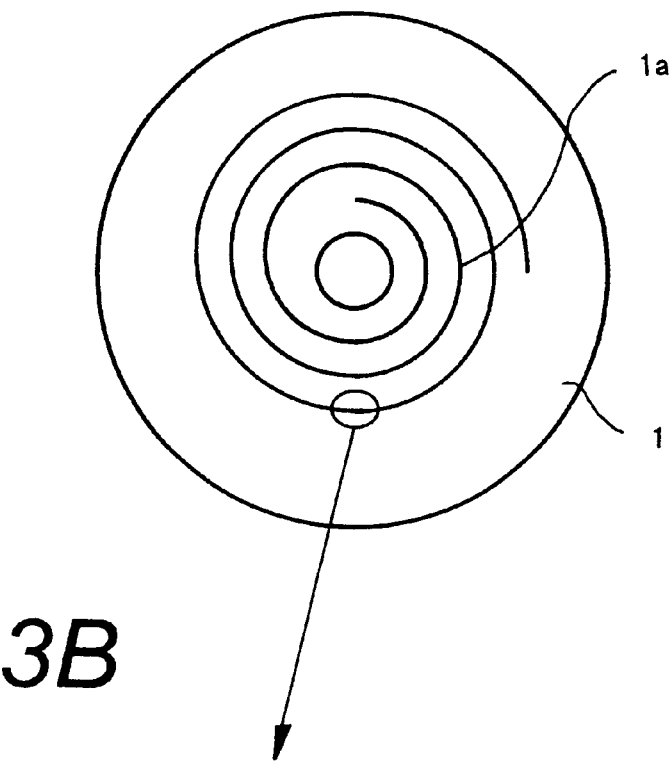
FIGS. 3A and 3B are schematic diagrams showing a wobbling groove of the disc-shaped record medium according to the invention.
Figure 3B:
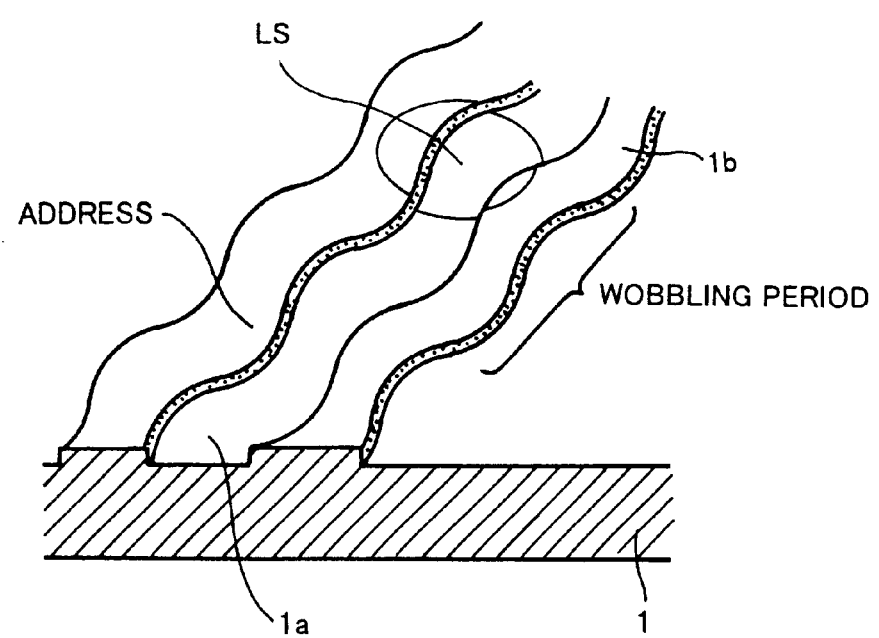

FIGS. 3A and 3B show examples of the structure of grooves of the optical disc 1. As shown in FIG. 3A, a pre-groove is spirally formed from the inner periphery to the outer periphery in a groove area of the optical disc 1.

As shown in FIG. 3B, the left and right side walls of the pre-groove 1*a* are wobbled corresponding to address information. In other words, the pre-groove 1*a* is wobbled at a predetermined period of a wobbling signal generated corresponding to an address. A land 1*b* is formed between adjacent grooves 1*a*. Data is recorded on a groove 1*a*. Thus, the track pitch is the distance between the centers of adjacent grooves 1*a*. The track pitch is for example 0.8 µm. The groove width (the width of the bottom portion of each groove 1*a*) is for example 0.48 µm. The width of each groove 1*a* is larger than the width of each land 1*b*.

The wobbling amount of each groove 1*a* is defined as the value of the wobble width WW. In this example, the wobble width WW is 12.5 nm. On each groove, the wobble amount instantaneously increases at predetermined intervals. A portion of which the wobble amount instantaneously increases is referred to as fine clock mark. In this portion, the wobble amplitude is for example 25 to 30 nm.

One track (one turn of the disc) has a plurality of wobbling address frames. Each wobbling address frame is divided into eight portions in the direction of the rotation of the disc. The eight portions are servo elements (segment 0 to segment 7). Each servo segment (hereinafter simply referred to as a segment) contains 48-bit information that is mainly an absolute address. The wobbling of each segment is composed of 360 waves.

Fine clock marks are formed on a wobbling groove at equal intervals. With the fine clock marks, a PLL circuit generates a reference clock signal so as to record data. 96 fine clock marks are formed per rotation of the disc. Thus, 12 fine clock marks are formed per segment.

Figure 4:
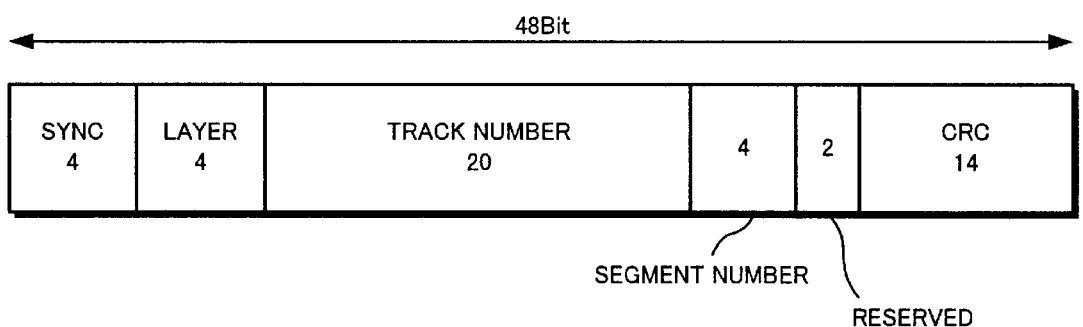
FIG. 4 is a schematic diagram for explaining the frame structure of the wobbling groove of the disc-shaped record medium according to the invention.

FIG. 4 shows the structure of each wobbling address frame as segments (segment 0 to segment 7). In each (48-bit) wobbling address frame, the first four bits are used for a synchronous signal that represents the start of the wobbling address frame. The four-bit synchronous pattern is bi-phase data of which four-bit data is composed of eight channel bits.

The next four bits are used for layer information that represents a layer number of a plurality of record layers or a layer structure of the disc.

The next 20 bits are used for a track address (track number) as an absolute address. The next four bits are used for a segment number. The segment number is a value in the range from "0" to "7" corresponding to segment 0 to segment 7. In other words, the segment number represents the circumference position of the disc. The next two bits are reserved. As the last 14 bits of the wobbling address frame, an error detection code (CRC) is added. As was described above, fine clock marks are formed in each wobbling address frame at equal intervals.

Figure 5:
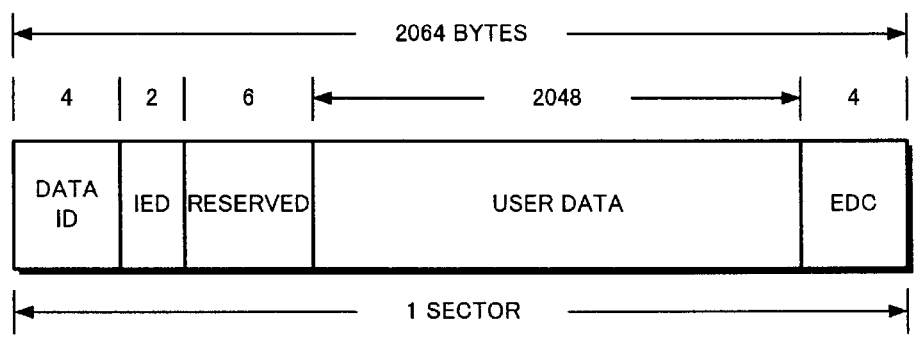
FIG. 5 is a schematic diagram showing a sector format of the disc-shaped record medium according to the invention.

Data is read/written as each ECC block. One sector is composed of, for example, 2 kbytes. One block is composed of for example 32 kbytes. FIG. 5 shows the structure of one sector. One sector is composed of data ID (four bytes), IED (two bytes), reserved area (six bytes), user data (2048 bytes=2 kbytes), and EDC (four bytes). In other words, one sector is composed of a total of 2064 bytes.

The data ID contains a track number and a sector number corresponding to an address of the wobbling groove. The IED is an error detection parity corresponding to a data ID (for example, CRC). The EDC is an error detection parity (for example, CRC) that is used so as to determine whether or not user data that has been error-corrected has an error.

Figure 6:
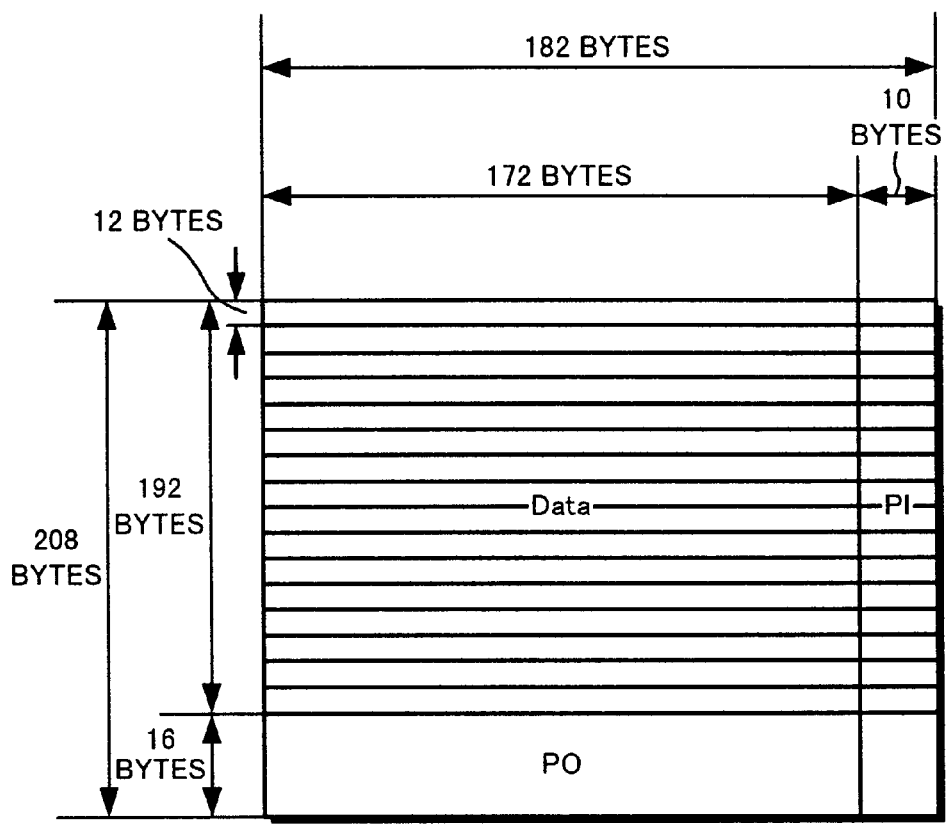
FIG. 6 is a schematic diagram showing a 32 kbyte format of the disc-shaped record medium according to the invention.

With 16 sectors (each of which has the structure shown in FIG. 5), an ECC block shown in FIG. 6 is composed. Each sector is composed of 2064 bytes (172 bytes×12). When 16 sectors (each of which is composed of 172 bytes×12) is vertically arranged as shown in FIG. 6, a data array of (172 bytes×192 (=12×16)) is formed. The user data of 192×172 bytes is encoded with a product code. In other words, data of each line (172 bytes) is encoded with an inner code (for example, Reed Solomon code). Thus, an inner code parity of 10 bytes (PI) is generated. In addition, data of each column (192 bytes) is encoded with an outer code (for example, Reed Solomon code). Thus, an outer code parity of 16 bytes (PO) is generated.

Figure 7:
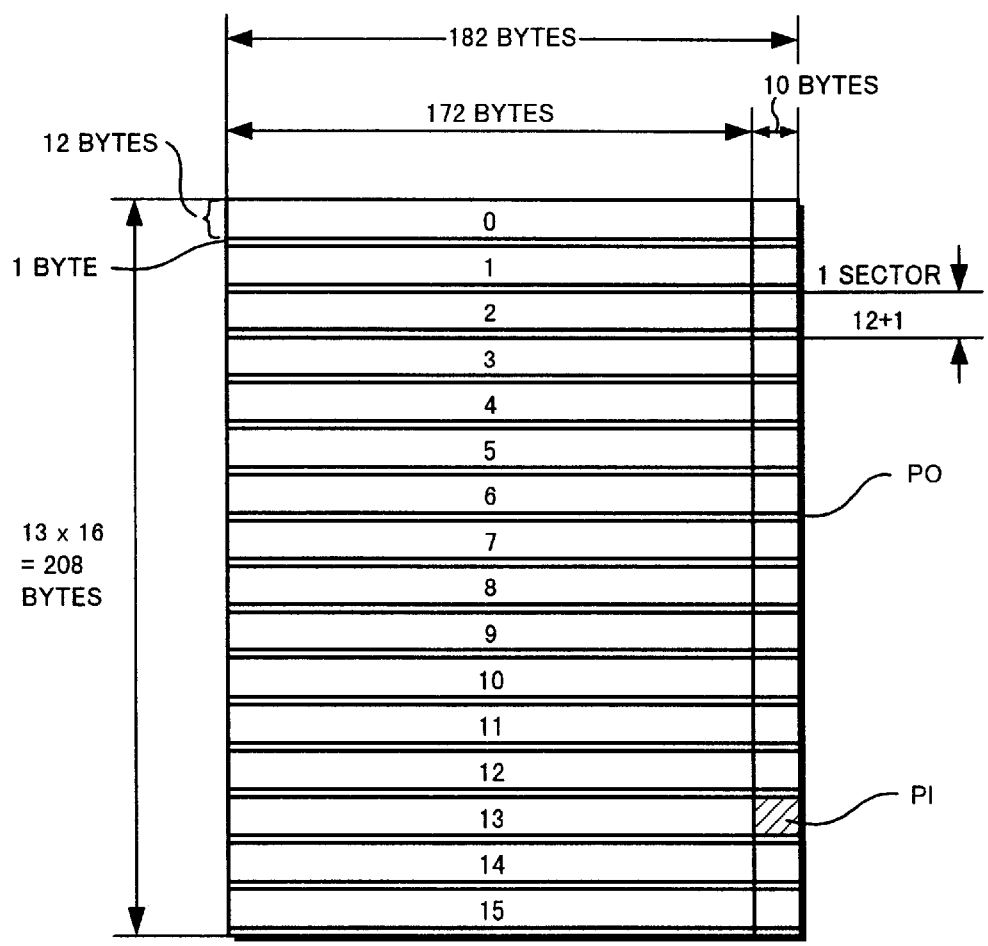
FIG. 7 is a schematic diagram showing an interleaved state of an outer code in the 32 kbyte format of the disc-shaped record medium according to the invention.

Moreover, in block segmented data of 182 bytes×208 (=(172+10)×(192+16)), the outer code parity (PO) of 182 bytes×16 is divided into data of 16×(182 bytes×1). As shown in FIG. 7, the divided portions of the outer code parity are interleaved with 16 sectors 0 to 15 (each of which is composed of (182 bytes×12)). In other words, each of the divided portions of the outer parity is placed at the end of each of the sectors. After the encoding process with the product code is performed, data of 13 (=12+1)×182 bytes is treated as data of one sector.

Figure 8:
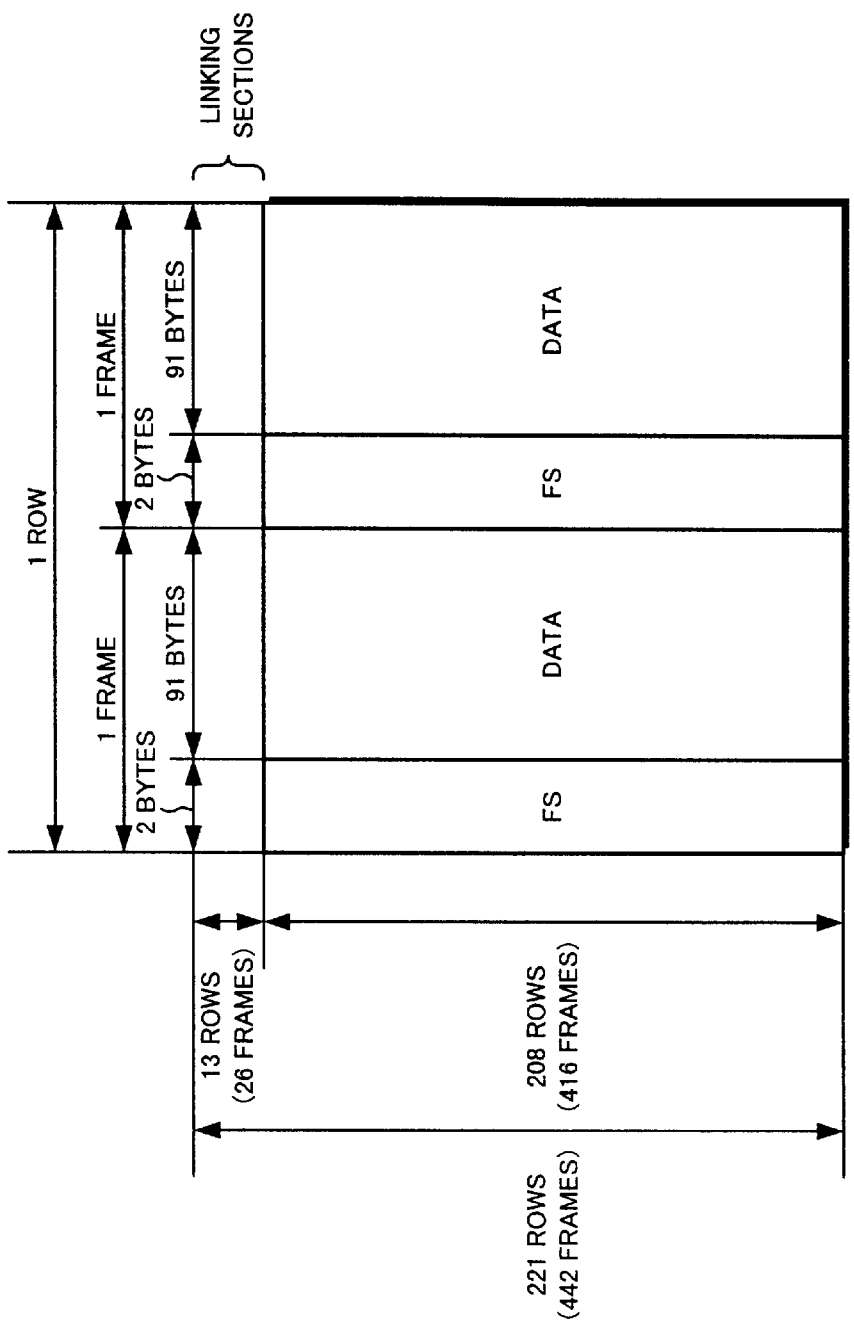
FIG. 8 is a schematic diagram showing the block structure of the disc-shaped record medium according to the invention.

When data of 182 bytes×208 shown in FIG. 7 is recorded on the disc, the data is recorded in the structure of a transmission frame shown in FIG. 8. In other words, 182 bytes of each line is divided into two portions as 208 (rows)×2 (frames). At the beginning of each portion of 208×2 frames, a linking section (data of link area) of 13 (rows)×2 (frames) is added. More accurately, a part of data of linking sections for 26 frames is recorded at the end of the preceding block. The rest is recorded at the beginning of the current block.

At the beginning of frame data of 91 bytes, a frame synchronous signal (FS) of two bytes is added. Thus, as shown in FIG. 8, data of one frame is composed of a total of 93 bytes. Consequently, one block is composed of 221 (rows)×93×2 bytes. In other words, one block (record/reproduction data unit) is composed of 442 frames. The size of the real data portion excluding the overhead portion becomes 32 kbytes (=2048×16/1024 kbytes).

As described above, according to the embodiment, one block is composed of 16 sectors. One sector is composed of 26 frames. A linking section is formed between two adjacent blocks. The linking section functions as an area for allowing data that is recorded or reproduced to synchronize with a clock signal.

Figure 9:
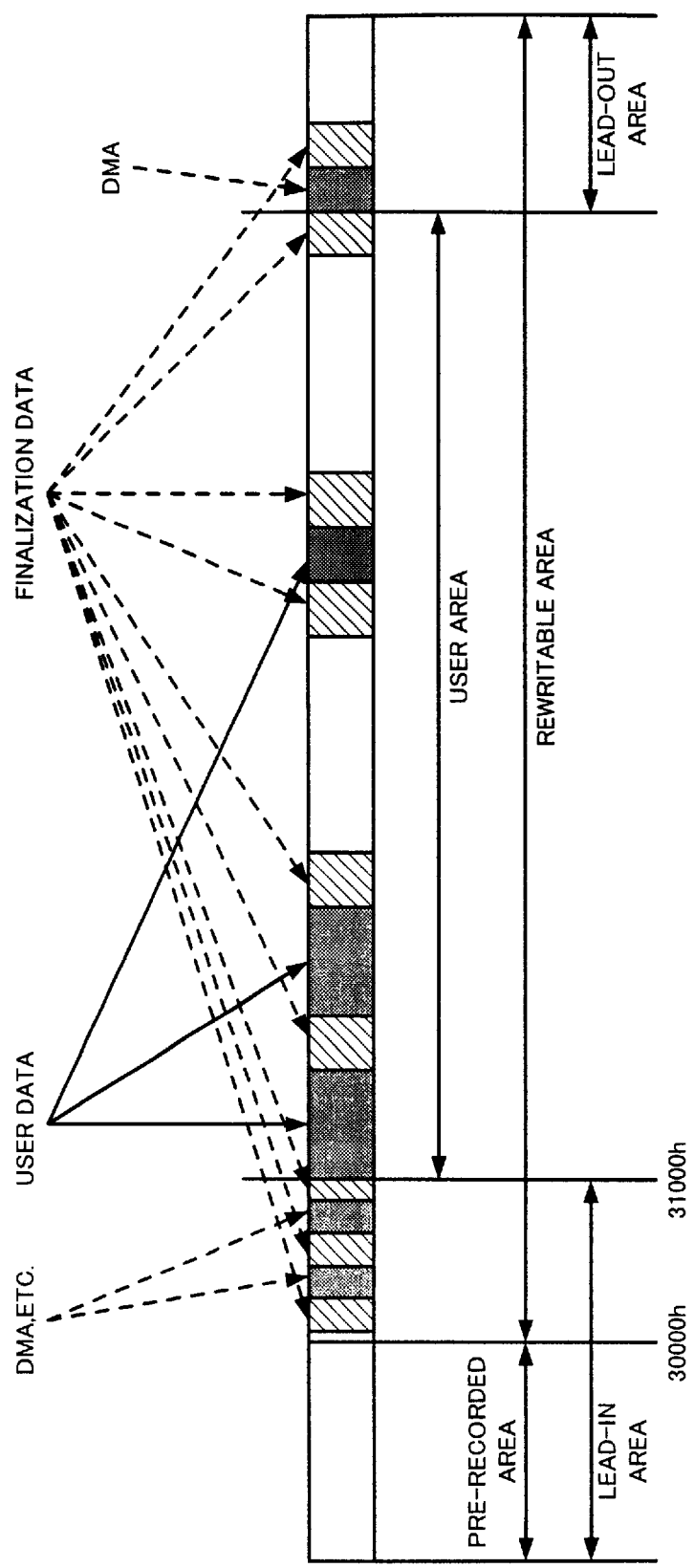
FIG. 9 is a schematic diagram for explaining a finalizing process.

The present invention relates to a finalizing process necessary for allowing a ROM drive (for example, a DVD-ROM drive) to reproduce data from an optical disc (for example, a DVD+RW disc). The data has been recorded on the optical disc by the above-described drive. FIG. 9 shows the concept of the finalizing process according to the present invention. In FIG. 9, data is recorded as blocks in a user area of a rewritable area in which a wobbling groove is formed.

When the DVD-ROM drive accesses the DVD+RW disc and reads data therefrom, the DVD-ROM drive repeats a coarse seek operation and a fine seek operation several times and obtains a target track. When the DVD-ROM drive performs the spindle servo operation and reads the data ID of each sector, if the data ID has not been recorded, the DVD-ROM drive cannot obtain a frame synchronous information as servo information. In this case, the spindle servo becomes out-of-control state. In addition, since the ID data is absent, the DVD-ROM drive cannot obtain position information. Thus, the DVD-ROM drive should always seek a recorded data area. Due to eccentricity or the like of the disc, even if the DVD-ROM drive jumps from the current track to a desired track, the obtained track deviates from the desired track to some extent. Thus, it is necessary to place dummy data (hereinafter referred to as finalization data) in such a range. Although the finalization data has no meaning (for example, all "0" data), the sector structure and the block structure thereof are the same as those of the above-described user data. Thus, the finalization data contains servo information (frame synchronous signal) and position information (ID).

FIG. 9 shows an example of the state of which as the result of the finalizing process, finalization data is recorded before and after a recorded area of a user area, a rewritable area (test zone, DMA, and so forth) of a lead-in area, and a rewritable area (DMA) of a lead-out area. The data amount of finalization data that is recorded is equivalent to the width of several hundred tracks although it depends on the seek accuracy of the drive, the amount of eccentricity of the disc, and so forth.

To perform the finalizing process, it is necessary to determine whether each block is a recorded block or non-recorded block. A bit map table that has bits that correspond to all blocks of the rewritable area and that represent whether the relevant blocks are recorded blocks or non-recorded blocks is created. In the bit map table, a recorded block and a non-recorded block are denoted by "1" and "0", respectively. Whenever a write command is executed, the bit corresponding to the relevant block is changed to "1". Thus, information that represents a recorded (written) block can be used. This bit map is referred to as WBBM (Written Block Bit Map).

In the structure shown in FIG. 1, the CPU 21 receives information corresponding to a write command. from the controller 5. Under the control of the CPU 21, a WBBM is formed in the RAM 23. At a predetermined timing (that will be described later), the CPU 21 reads the WBBM from the RAM 23. The controller 5 records the WBBM to a predetermined area of the lead-in area of the optical disc 1 as with the user data. When the user issues to the host processor 10 (or the disc drive) a command for executing the finalizing process, the command is sent to the CPU 21. Thus, the CPU 21 causes the disc drive to write a predetermined amount of finalization data before and after each recorded block corresponding to the latest WBBM.

Figure 10:
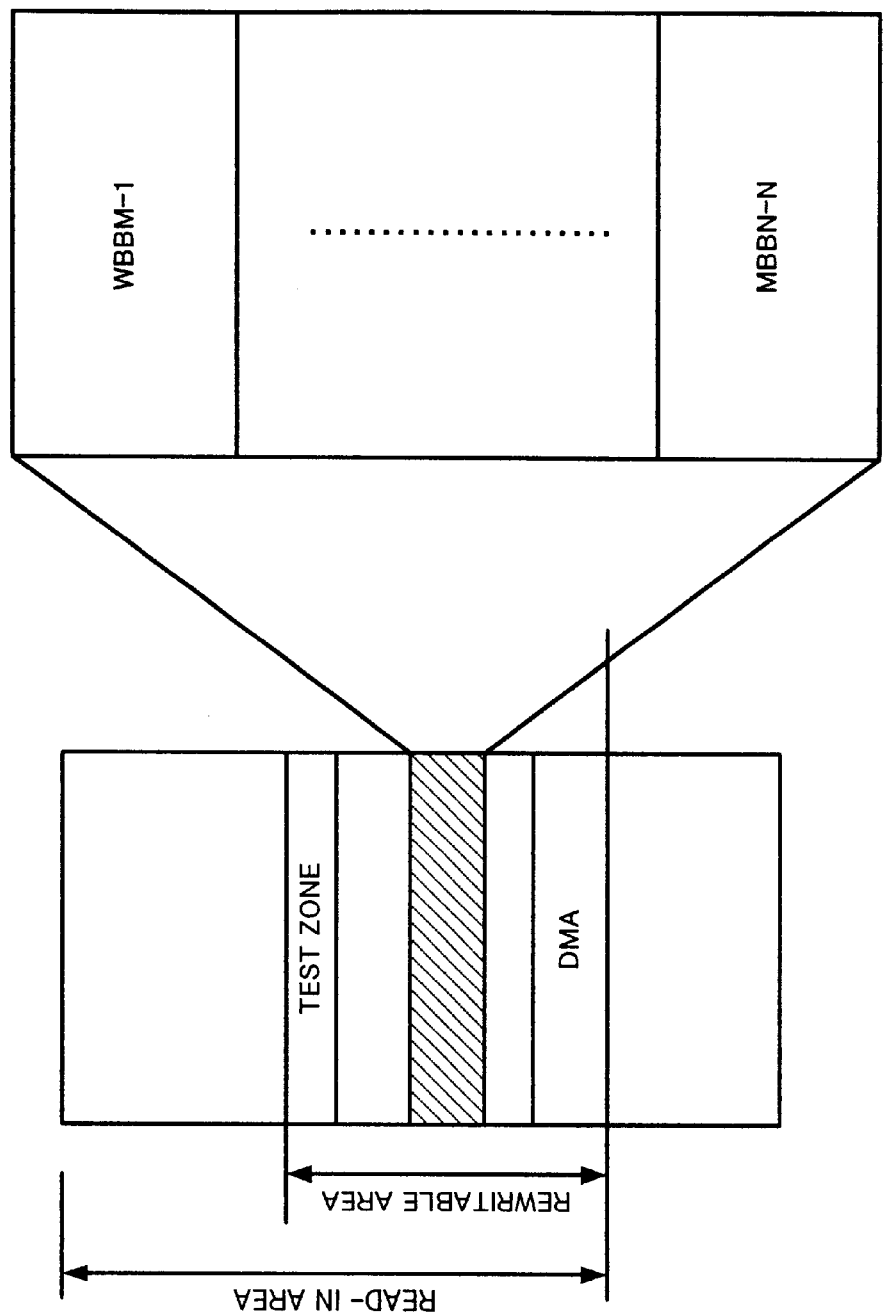
FIG. 10 is a schematic diagram for explaining record positions of WBBMs.

As shown in FIG. 10, the WBBM is placed in the lead-in area along with a test zone, a DMA, and so forth. The WBBM can be placed in the range from 30000h to 31000h of the lead-in area. Guard zones are preferably placed before and after the WBBM. Theoretically, the finalizing process can be performed with one WBBM. However, to improve the reliability of the finalizing process and decrease the number of times of the write operation to the same area, it is very effective to provide a plurality of WBBMs (WBBM-1 to WBBM-N). Since the number of times of the write operation is limited in phase change type disc mediums (around 100,000 times), if the write operation is repeatedly performed in the same area, the life of the medium is shortened.

Next, an example of the structure of the WBBM will be described in detail. As described above, one block is composed of 16 sectors (32 kbytes). Since one DVD+RW disc has a storage capacity of around 3 Gbytes, the disc has 90,000 to 100,000 blocks. When each block is correlated with one bit, a bit map of around 12 kbytes is required. By adding management information to the bit map, one WBBM is structured. When a WBBM is recorded on the disc, as with user data, an encoding process with a product code and a frame structuring process are performed. In other words, one ECC block is composed of one WBBM.

Figure 11:
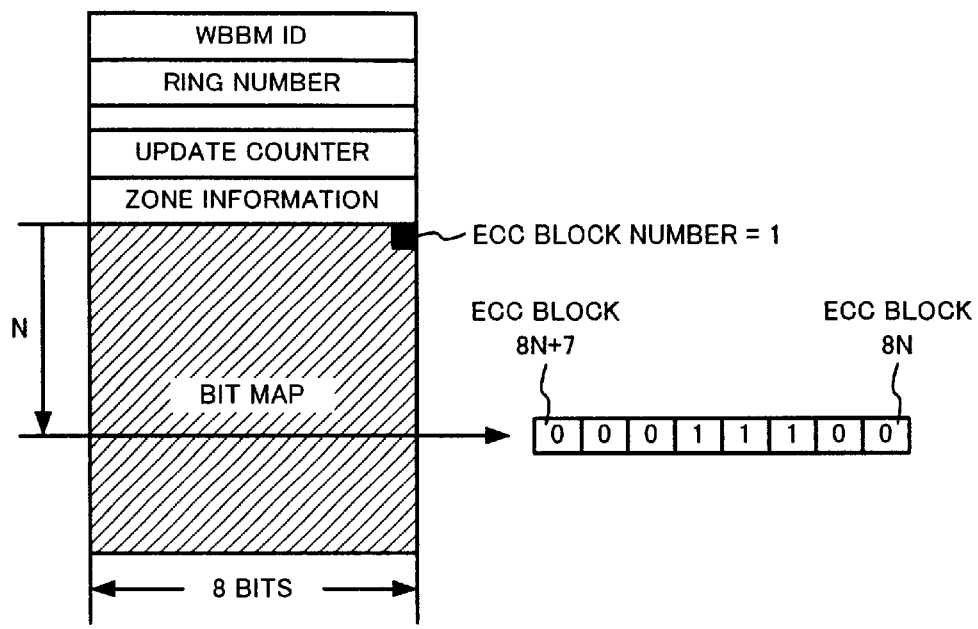
FIG. 11 is a schematic diagram for explaining the data structure of a WBBM.

As shown in FIG. 11, in one WBBM, a WBBM identifier, a ring number, an update counter, and zone information are added to bit map data. The bit map is composed of bytes. The upper right corner of the bit map represents a bit corresponding to a block of which the ECC block number is 1. The ECC block number increases in the left direction of each byte. In addition, the ECC block number increases in the lower direction of the bit map. The left portion of FIG. 11 shows an enlarged view of the N-th byte. The N-th byte includes bits whose ECC block numbers are 8N to 8N+7. In the N-th byte, a bit whose value is "0" represents that an ECC block corresponding thereto is a non-recorded block. In contrast, a bit whose value is "1" represents that an ECC block corresponding thereto is a recorded block.

The management information includes the following items each of which is composed of one byte.

WBBM identifier: A numeric value representing that a relevant ECC block is a WBBM (for example, 0C0Ch).

Ring number: Represents the number of WBBMs that are treated as one set and the order of a particular WBBM in the set.

Update counter: A value that is incremented whenever a WBBM is updated. A WBBM with the maximum value of the update counter in the set of WBBMs is determined as the latest WBBM. A WBBM with the minimum value of the update counter is updated to the latest WBBM. Thus, a write operation can be prevented from being concentratedly performed to a particular WBBM. Consequently, the disc medium can be prevented from deteriorating. Even if data of the latest WBBM is destroyed, with information of a WBBM having the maximum value of the update counter, the destroyed WBBM can be almost restored.

Zone information: When the finalizing process is performed, it is not effective to check all bits. To solve such a problem, all the rewritable area is divided into a plurality of zones. When data has been written to all blocks of each zone, a flag that represents that data has been recorded to all blocks is set. Once the flag is set, the finalizing process is not performed for the zone.

Figure 12:
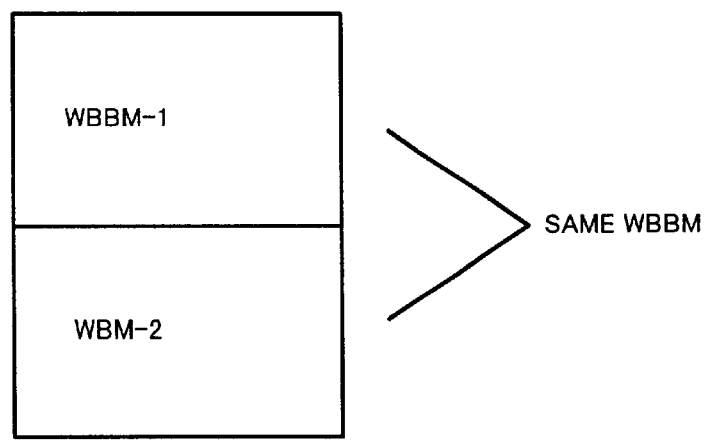
FIG. 12 is a schematic diagram for explaining a redundant write operation of WBBMs.

As shown in FIG. 12, to improve the reliability of the finalizing process, a plurality of WBBMs with the same content may be written. In this case, whenever a WBBM is updated, all the WBBMs are rewritten.

Figure 13:
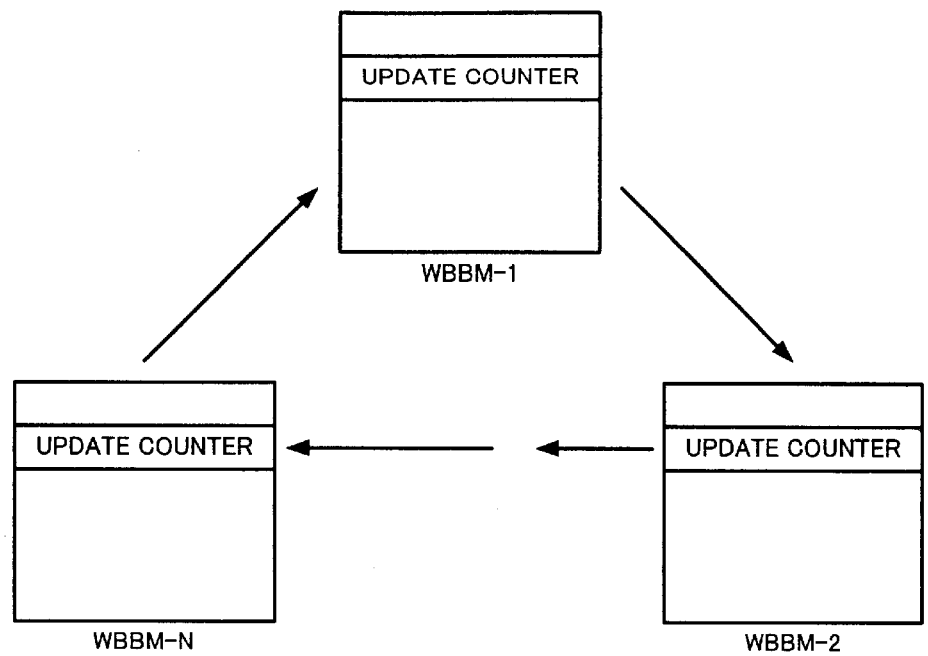
FIG. 13 is a schematic diagram for explaining a ring structure of WBBMs.

FIG. 13 shows an example of the ring structure of a plurality of WBBMs (WBBM-1, WBBM-2, ..., and WBBM-N). The update counter of each WBBM is initialized to, for example, "0". When the WBBM-1 is updated, the value of only the update counter thereof becomes "1". Next, when the WBBM-2 is updated, the value of only the update counter thereof becomes "2". Next, when the WBBM-3 is updated, the value of only the update counter thereof becomes "3". In such a manner, a WBBM with the minimum value of the update counter is updated. If the values of the update counters of two WBBMs are the same, a WBBM with a lower WBBM number is updated. Thus, a WBBM with the maximum value of the update counter is determined as the latest WBBM.

Even if a WBBM is not the latest WBBM (even if several recorded bits are lost), the WBBM is effective information. In other words, before finalization data is written to an ECC block that is determined as a non-recorded block corresponding to the WBBM, the ECC block is checked. Even if the bit corresponding to the ECC block is incorrect, since the finalization data is written, recorded data is not destroyed. Thus, when a plurality of WBBMs are used and the oldest WBBM is rewritten, later WBBMs remain. In the case that a WBBM with the maximum value of the update counter is defined as the latest WBBM, when the drive spins up and reads a WBBM, it can determine the latest WBBM.

The advantages of the ring structure of WBBMs are as follows.

Since the number of times of the write operation to a particular WBBM is decreased to 1/(the number of rings of WBBMs), the medium can be suppressed from deteriorating.

Even if a defect such as power failure of the drive takes place during a write operation of a WBBM, since the preceding WBBM resides, it can be used as the latest WBBM.

A method for creating a plurality of WBBMs with the same content can be used (redundant write operation (see FIG. 12)). This method is the simplest countermeasures against a power failure. In this case, the values of all the update counters should be the same. If the counter value of a particular WBBM is different from the counter values of the other WBBMS, it can be supposed that while a WBBM was being updated, a power failure took place. In this case, a WBBM with a larger value of the update counter is the latest WBBM. The ring structure and the redundant write operation can be used together.

Next, with reference to FIGS. 14A and 14B, other examples of a WBBM will be described. In the example shown in FIG. 14A, a user data map (referred to as user WBBM) is paired with the above-described WBBM (referred to as conventional WBBM). Since a conventional WBBM only represents whether each block is a recorded block or a non-recorded bloc, it cannot represent whether data of a recorded block is user data or finalization data. In the user WBBM, a bit "1" is set to a block to which user data is written. Thus, a bit corresponding to a block to which finalization data is written is still "0".

With the user WBBM, after a DVD-ROM drive has reproduced data from a DVD+RW disc to which finalization data had been written, a DVD+RW drive can write data to the DVD+RW disc. In this case, to allow the DVD-ROM drive to reproduce data from the DVD+RW disc, finalization data should be written to the DVD+RW disc. Since a conventional WBBM is composed of a bit map of user data and a bit map of finalization data (namely, the WBBM represents whether recorded blocks), the user data and the finalization data cannot be distinguished with the WBBM. As a result, finalization data is redundantly written. On the other hand, with both a user WBBM and a conventional WBBM, finalization can be prevented from being redundantly written.

Figure 14A:
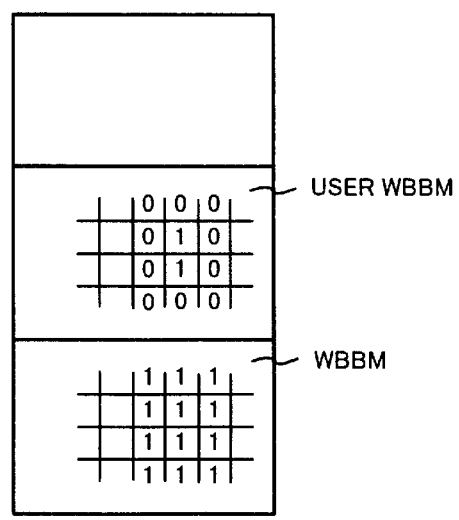
FIGS. 14A and 14B are schematic diagrams for explaining a WBBM having a bit map for user data.
Figure 14B:
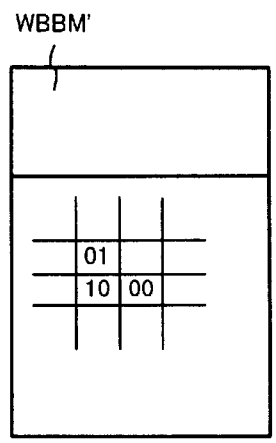

Unlike with the structure of which a user WBBM is paired with a conventional WBBM as shown in FIG. 14A. a portion corresponding to each block on the bit map may be composed of two bits so as to distinguish a record block of user data and a record block of finalization data as shown in FIG. 14B. With such a bit map that allows user data and finalization data to be distinguished, the finalizing process can be more effectively performed.

When a DVD+RW disc is formatted, a WBBM is written to a predetermined area of the lead-in area of the DVD+RW disc. When a blank DVD+RW disc is formatted, if the certificating process is not performed, all the user area becomes non-recorded state. On the other hand, if the certificating process is performed, all the user area becomes recorded state. When the DVD+RW disc is reformatted, since recorded data resides in the user area, the existing WBBM is used.

Figure 15:
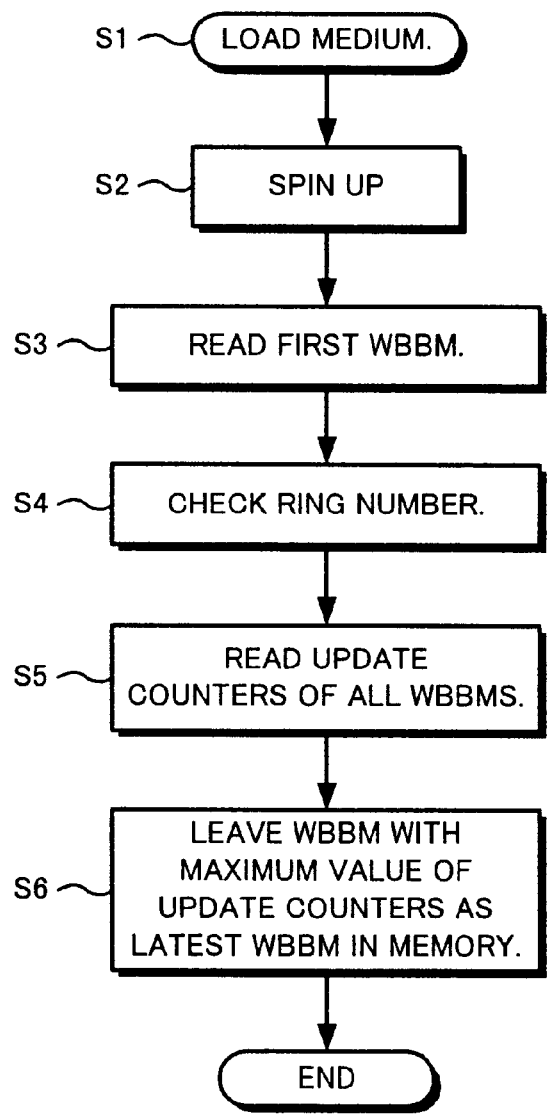
FIG. 15 is a flow chart for explaining a process performed when a medium is loaded to a drive.

When a DVD+RW disc is loaded to a drive, a WBBM is read to a memory (RAM 23 shown in FIG. 1) of the drive. FIG. 15 is a flow chart showing a process of the CPU 21 performed when a medium is loaded to the drive. At step S1 shown in FIG. 15, the medium is loaded to the drive. At step S2, the drive spins up and reproduces a DMA and a WBBM in the lead-in area. The drive reads the first WBBM (at step S3) and checks the ring number (management information) of the WBBM (at step S4). When the WBBM is ring-structured, since there are a plurality of WBBMs, the drive reads all WBBMs in the RAM 23 and reads values of update counters thereof (at step S5). The drive compares the values of the update counters of all the WBBMs and leaves a WBBM with the maximum value of the update counter in the RAM 23 (at step S6). When the certificating process has been completed or data has been written to all the user area, it is not necessary to leave the WBBM in the RAM 23 or update the WBBM. This determination is performed by the CPU 21 of the drive. A flag is controlled corresponding to the determined result.

Figure 16:
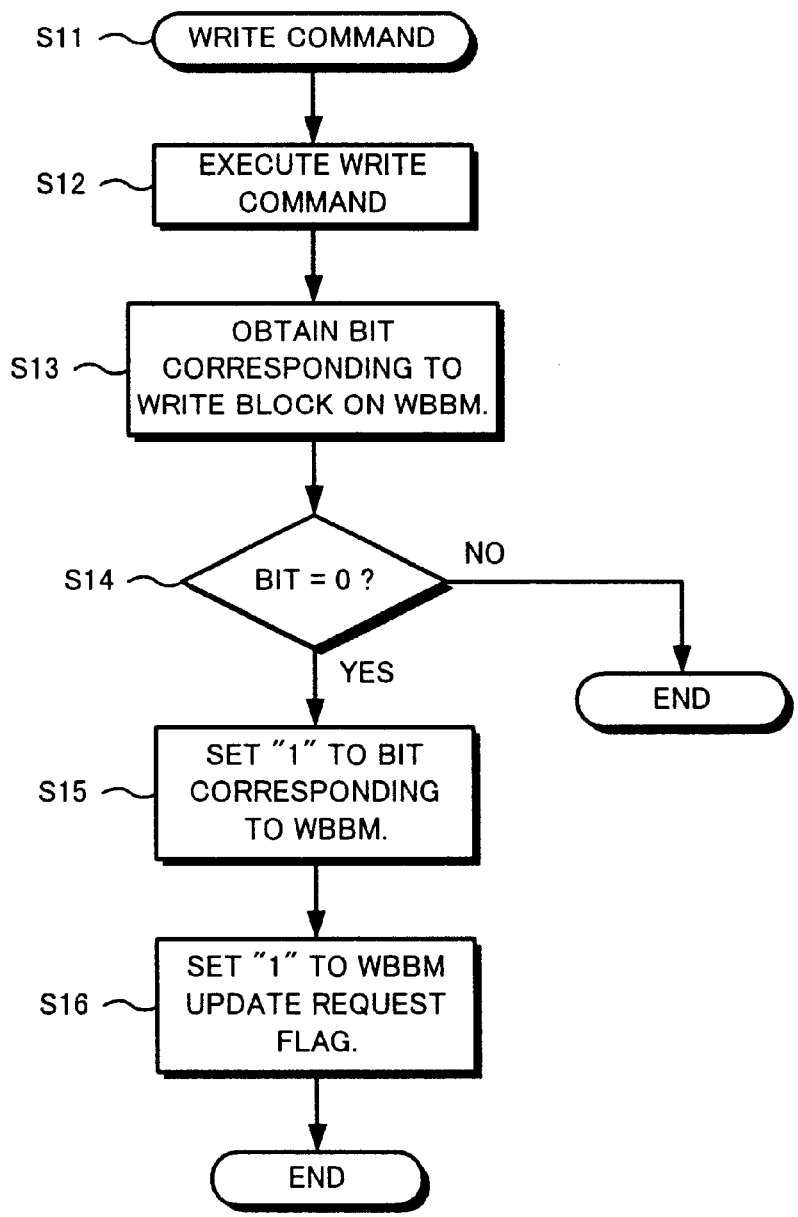
FIG. 16 is a flow chart for explaining a process performed when a write command is executed.

Next, with reference to a flow chart shown in FIG. 16, a process of the CPU 21 for rewriting a WBBM stored in the RAM 23 will be described. This process is performed when a write command is executed. For simplicity, it is assumed that there is no user WBBM. When the drive spins up a medium (optical disc 1) and determines that a conventional WBBM thereof should be managed, this process is performed. A write command from the host processor 10 is received (at step S11). When the execution of the write command is completed at step S12 (namely, it is determined that data has been recorded to all of one block), the drive obtains a bit of the WBBM in the RAM 23 corresponding to the block on the bit map (at step S13), and determines whether or not the bit is "0" (at step S14).

When the bit is "1", it represent that the block is a recorded block. Since it is not necessary to update the bit, the process is completed. In contrast, when the bit is "0" the bit corresponding to, the block on the WBBM stored in the RAM 23 is set to "1" (at step S15). In addition, a flag that represents that the WBBM stored in the RAM 23 has been updated is set (this flag is referred to as a WBBM update request flag). In this case, the flag is set to "1". At a predetermined timing (in an eject state of the optical disc 1, in a flash cache process, or in a background state), the WBBM of the optical disc 1 is updated. After the WBBM has been updated, the WBBM update request flag is cleared. In the flag cache process, whenever a write command is received, data is temporarily stored in the write cache. Thus, a predetermined number of times of the write command can be executed at a time. The background state is a non-busy state of the CPU of the drive.

Figure 17:
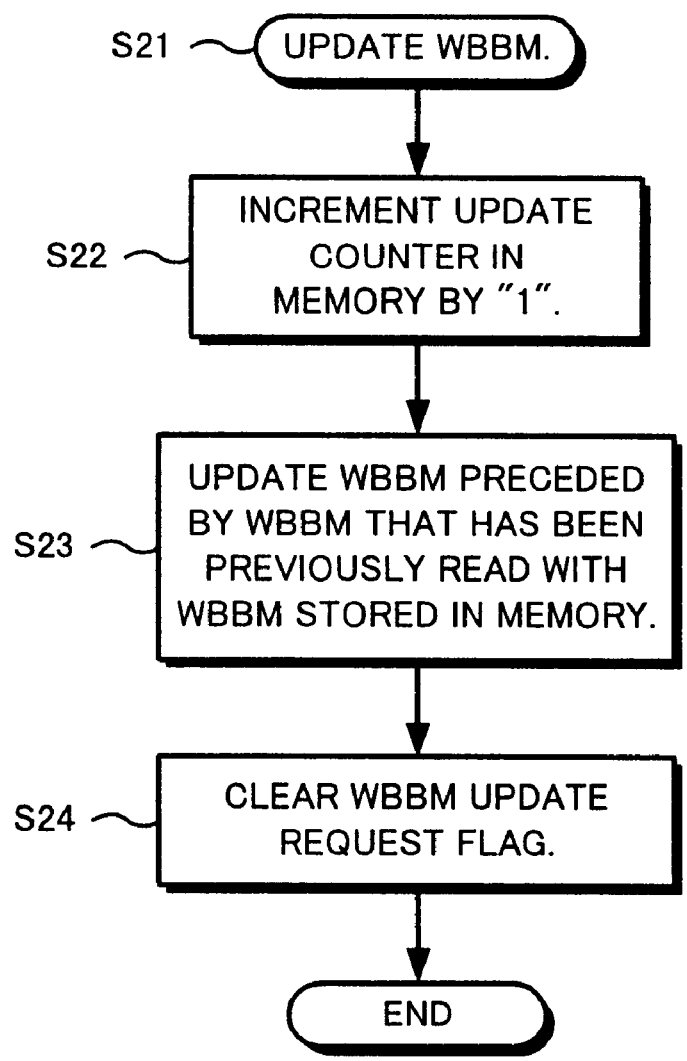
FIG. 17 is a flow chart for explaining a process for updating a WBBM.

FIG. 17 is a flow chart showing a process of the CPU 21 when WBBMs are updated. This process is executed at a predetermined timing. In this example, it is assumed that WBBMs are ring-structured. When the WBBM update request flag is "1", a WBBM is updated (at step S21). The update counter of the WBBM stored in the RAM 23 is incremented by "1" (at step S22).

At step S23, a WBBM preceded by a WBBM that has been previously read is updated with the WBBM stored in the RAM 23. In this process, among some WBBMs of the optical disc 1, a ring number corresponding to a WBBM with the minimum value of the update counter is set. A WBBM with the minimum value of the update counter is replaced with the latest WBBM stored in the RAM 23. Since the updating process is completed, the WBBM update request flag is cleared at step S24.

To allow a DVD-ROM drive to reproduce data from a DVD+RW medium, the user issues a command that causes the drive to execute a finalizing process. Next, with reference to a flow chart shown in FIG. 18, the finalizing process of the CPU 21 performed by the drive will be described. At step S31, when the drive receives the finalization command from the host processor 10, a WBBM on the optical disc 1 is replaced with a WBBM stored in the RAM 23. Thus, the WBBM stored in the RAM 23 is the latest WBBM. Alternatively, the latest WBBM may be read from the optical disc 1.

At step S32, with reference to the WBBM stored in the RAM 23, all non-recorded blocks adjacent to recorded blocks (bit="1") in a predetermined range (for example, blocks equivalent to 300 tracks) are listed up. The listed blocks are denoted by B(0), B(1), B(2), ... and B(N−1). At step S32, the initial value of the variable I is (0).

At step S33, it is determined whether or not the variable I is N. When (I=N), since the finalization data has been recorded to all non-recorded blocks, the updating process for the WBBM is performed (at step S34) as described above (see FIG. 17).

The finalization data is recorded from the block B(0) to the block B(N−1). In this case, it is determined whether or not an area to which finalization data is recorded corresponding to the WBBM is a non-recorded area. Even if it is determined that a particular block is a non-recorded block (bit=0) corresponding to the WBBM, due to a power failure, the block may be a recorded block. When the block is a recorded block, if the finalization data is overwritten, recorded user data will be destroyed. To prevent such a problem, a read operation is performed for an area to which finalization data is recorded (at step S35).

At step S36, it is determined whether or not data has been read. When data has been read or it is not necessary to record data, since the block B(I) is a recorded block or a record unnecessary block, the finalization data is not recorded. When data cannot be read, the finalization data (dummy data) is recorded to the non-recorded block B(I) (at step S37). At step S38, the variable I is incremented. At step S39, the bit corresponding to the recorded block on the WBBM is set to "1".

The reading operation for verifying a non-recorded block, the recording operation of the finalization data for a verified non-recorded block, the incrementing operation for the variable I, and the process for setting the bit corresponding to the block on the WBBM to "1" are performed for all non-recorded blocks that have been listed up. Thereafter, at step S34, the bit corresponding to a block that has been determined as a recorded block on the WBBM is set to "1". The WBBM stored in the RAM 23 is written to the optical disc 1.

Figure 18:
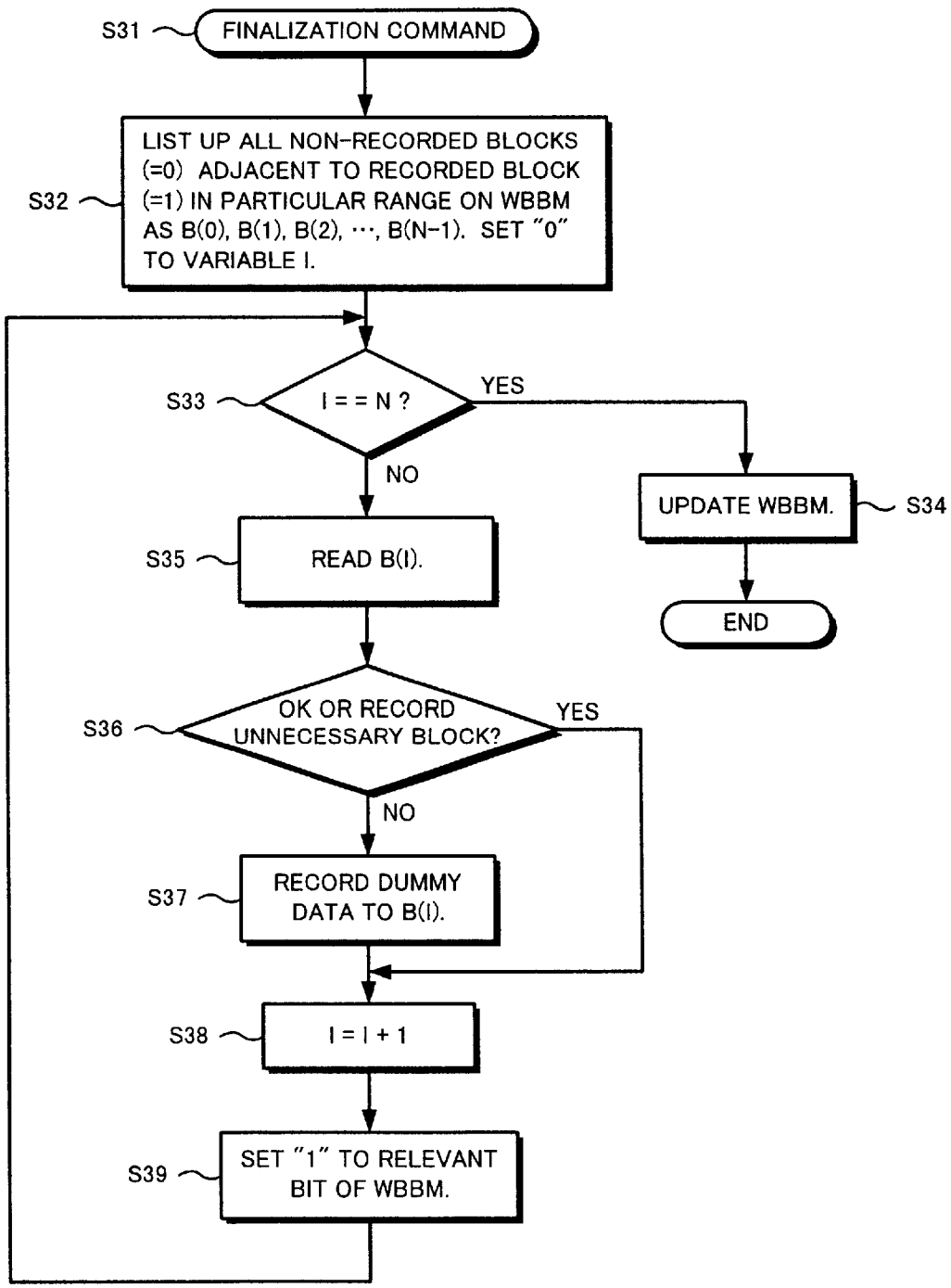
FIG. 18 is a flow chart for explaining the finalizing process.

In the flow chart shown in FIG. 18, a plurality of blocks that have been listed up are processed one after the other. Alternatively, all blocks that have been listed up may be read and it can be determined whether or not they are recorded blocks. Thereafter, finalization data may be written to all non-recorded blocks. In this case, the process can be effectively performed and thereby preferably implemented.

As described above, a WBBM is used to effectively perform the finalizing process. In addition, the WBBM can be used to effectively perform the read modified write operation. A DVD–RW disc is accessed for data of 2 kbytes (one sector) at a time by the host processor. Likewise, the buffer memory of the drive is accessed. On the other hand, the disc is accessed for data of 32 kbytes of a ECC block at a time by the drive. When the drive receives a read command for data of 2 kbytes, it reads a block (32 kbytes) including the sector and sends the data of 2 kbytes to the host. In this case, the drive discards the remaining data of 30 kbytes.

Figure 19:
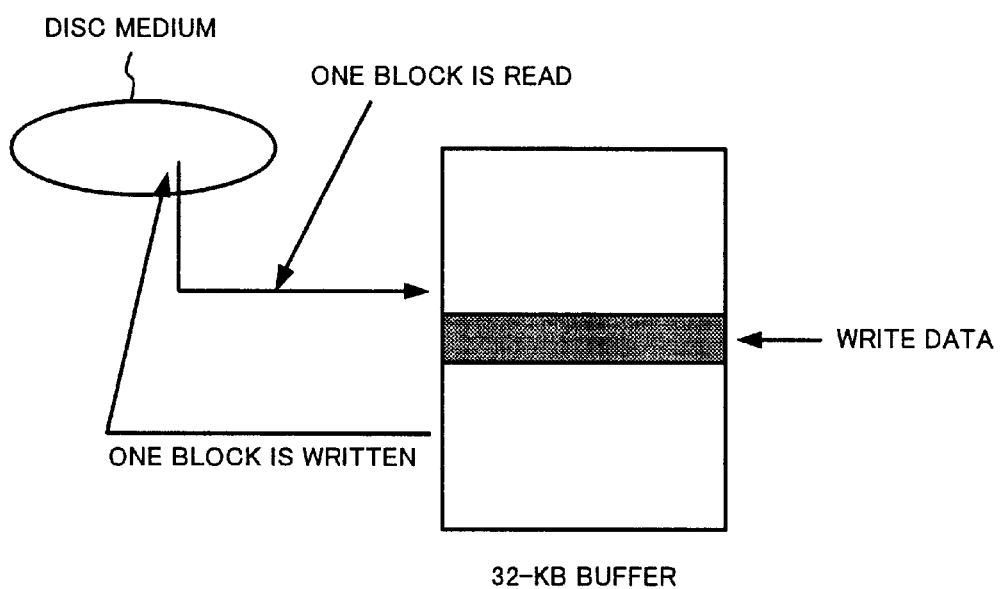
FIG. 19 is a schematic diagram for explaining a read modified write operation.

The write operation is more complicated than the read operation. As shown in FIG. 19, when the drive writes data of 2 kbytes to a particular block of the disc, if data has been recorded in the block, the drive should read the block, replace data of 2 kbytes of the relevant sector with write data received from the host processor, and then write data of 32 kbytes to the original block. This process is referred to as a read modified write operation. In this case, to write data of 2 kbytes to the disc, the drive reads data of 32 kbytes from the disc and then writes data of 32 kbytes thereto. To prevent the read modified write operation, the drive temporarily stores write data in a buffer memory (the buffer memory 6 shown in FIG. 1) and completes the write command. This operation is referred to as a write cache operation.

Generally, the host computer tends to write successive sectors. Thus, as the host computer stores write data, data of one block may take place. In this case, the drive only performs the write operation for data of 32 kbytes without the read operation. The drive can write a plurality of blocks at a time. However, the drive may write data of 2 kbytes at a time. In addition, when the drive writes long data, it should perform the read modified write operation at the beginning and the end of the data.

When the drive performs the read modified write operation for a particular block, the block may be a non-recorded block. Generally, when the drive cannot read a block, it determines that the block is a non-recorded block corresponding to information such as a signal level. When the block is a non-recorded block, the drive places all "0" data in the block except for write data received from the host processor. In this case, when the drive can determine that the block is a non-recorded block, it can perform the write operation without the read operation. In other words, the performance can be improved two times. To improve the efficiency of the read modified write operation, a WBBM can be used.

For a recorded block on a WBBM, when the drive writes a part of sector (2 kbytes), it should perform the read modified write operation. On the other hand, for a non-recorded block (bit="0") on a WBBM, although a recorded portion may be treated as a non-recorded portion due to a power failure or the like, the block is almost a non-recorded block. Thus, the drive can place all "0" data in the block except for write data received and perform the write operation without the read modified write operation.

In most file systems, a medium is used in the ascending order of LBA (logical block address). Thus, the drive tends to write data in an area preceded by write data. On the other hand, in the case of a medium that is used without the certifying process, the probability of which an area preceded by write data is a non-recorded area is very high.

Thus, in the case that the CPU 21 has read an area adjacent to a write area and determined that the read area is a non-recorded area, when the CPU 21 receives a write command for the area, it can immediately perform the write operation without the read modified write operation. While the host processor 10 is not accessing the CPU 21, it checks a WBBM in the RAM 23, reads a portion preceded by a recorded area of the optical disc 1, and determines that the portion is a non-recorded portion. This operation may be performed in a relatively narrow range for the next write command.

When the CPU 21 receives a write command for the area (or caches the write command), if it has determined that the area is a non-recorded area, it places all "0" data as data in the same block other than the write data and performs the write operation, for example, without the read modified write operation. Alternatively, after the CPU 21 has performed the write operation, it updates the WBBM in the RAM 23. Thus, the drive determines whether or not the next area is a non-recorded area.

The present invention is not limited to the above-described embodiment. Instead, various modifications are available. For example, the present invention can be applied to a rewritable disc-shaped record medium other than the DVD+RW medium and to a WO (Write Once) disc-shaped record medium. In addition, the present invention can be applied to a disc of which address information is recorded in other than wobbling groove format. Moreover, the servo information may be information for either CAV or CLV. Furthermore, finalization data may be recorded before or after a recorded block.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

According to the present invention, since a bit map that represents that each block is a recorded block or a non-recorded block is provided, in comparison with a method for analyzing a file system, the drive can execute a finalizing process regardless of a file system for use. In addition, even if the number of directories/files is large, the drive can effectively perform the finalizing process.

In addition, according to the present invention, in comparison with a method for reading all blocks and determining whether they are recorded blocks or non-recorded blocks, the drive can quickly perform the finalizing process. In addition, the user is not requested to perform the certifying process. Since the period necessary for the finalizing process is much shorter than the period necessary for the certifying process, the efficiency is very high for the user.

When WBBMs are ring-structured, the number of times of the write operation for a WBBM to the same block can be decreased. Thus, the medium can be prevented from deteriorating. An area preceded by a recorded area is pre-read in background state. When a write command for the area is received, it is not necessary to perform the read modified write operation. Thus, the performance can be improved. In particular, in the case of the flush cache process, a write cache disable command, or a command with an FUA flag (that causes data not to be cached and write operation to be immediately performed) is used, the operation is very effectively performed.

What is claimed is:

1. A recording apparatus for use with a disc-shaped record medium having a user data area and a management area, comprising:

recording means for recording at least one bit map that represents whether or not each data unit for recording/reproducing has been recorded; and processing means for recording the bit map to the management area of the disc-shaped record medium, and referencing the bit map and adding a predetermined amount of data that contains at least one of servo information and position information to a non-recorded area in the vicinity of recorded data so as to allow a reproducing apparatus that reproduces data from a read-only disc-shaped medium and obtains at least one of the servo information and the position information from a reproduced signal to reproduce data from a rewritable disc-shaped record medium, wherein the management area includes a plurality of bit maps and an update counter, each of the bit maps has a value of an update counter that represents the number of update operations of the bit map, and the processing means rewriting the plurality of bit maps successively and rewriting the value of the update counter of the bit map rewritten based on the number of update operations.

2. The recording apparatus as set forth in claim 1 wherein the processing means rewriting redundantly the plurality of bit maps at a time.

3. The recording apparatus as set forth in claim 1 wherein the management area includes a user data bit map which a respective bit map is paired with, and the user data bit map represents whether or not the user data has been recorded for each record/reproduction data unit.

4. The recording apparatus as set forth in claim 1 wherein at least one bit map comprises a user data bit map, the user data bit map has a first bit and a second bit for each record/reproduction data unit, and one of the first bit and the second bit represents whether or not each record/reproduction data unit has been recorded and the other of the first bit and the second bit represents whether or not the user data has been recorded for each record/reproduction data unit.

5. The recording apparatus as set forth in claim 1 wherein the recording means stores bit map data corresponding to the plurality of bit maps, the processing means performs an updating process which rewrites the bit map data whenever a write operation is performed and which records the bit map data to the management area at a predetermined timing of which a write operation and a read operation are not performed.

6. The recording apparatus as set forth in claim 5 wherein the predetermined timing is an eject state of the disc-shaped record medium.

7. The recording apparatus as set forth in claim 5 wherein the predetermined timing is a flush cache state.

8. The recording apparatus as set forth in claim 5 wherein the predetermined timing is a background state in which a command is not received from the outside of the recording apparatus.

9. The recording apparatus as set forth in claim 1 wherein the processing means references the plurality of bit maps, lists up a non-recorded area in the vicinity of recorded data, and records a predetermined amount of data that contains at least one of the servo information and the position information to the verified non-recorded area after verifying the non-recorded state of the non-recorded area by reproducing the listed non-recorded area.

10. The recording apparatus as set forth in claim 1 wherein the processing means verifies whether or not a partial area preceded by a recorded area is a non-recorded area before performing a write operation by referencing the plurality of bit maps.

11. The recording apparatus as set forth in claim 10 wherein the processing means performs a write operation for the verified non-recorded area without performing a read operation of a read modified write operation.

12. A recording method for use with a disc-shaped record medium having a user data area and a management area, comprising the steps of:

creating a plurality of bit maps composed of bits that represent whether or not each record/reproduction data unit has been recorded;

recording the bit maps to the management area of the disc-shaped record medium, wherein each of the bit maps has a value of an update counter that represents the number of update operations of the bit map;

referencing the bit maps and adding a predetermined amount of data that contains at least one of servo information and position information to a non-recorded area in the vicinity of recorded data so as to allow a reproducing apparatus that reproduces data from a read-only disc-shaped medium and obtains at least one of the servo information and the position information from a reproduced signal to reproduce data from a rewritable disc-shaped record medium; and rewriting tie plurality of bit maps successively and rewriting the value of the update counter of the bit map rewritten based on the number of update operations.

13. A disc-shaped record medium having a first rewritable area for recording user data and a second rewritable area for recording management data, wherein at least one of servo information and position information is pre-recorded as wobbling information in a wobbling groove, and wherein the second rewritable area has a bit map that represents whether or not each data unit for recording/reproducing for the first rewritable area has been recorded.

14. The disc-shaped record medium as set forth in claim 13 wherein dummy data is added in the vicinity of recorded data in the first rewritable area and the second rewritable area.

15. The disc-shaped record medium as set forth in claim 14 wherein the dummy data has servo information and position information which are necessary for a reproducing apparatus that reproduces data from a read-only disc-shaped medium.

* * * * *

UNITED STATES PATENT AND TRADEMARK OFFICE
CERTIFICATE OF CORRECTION

PATENT NO. : 6,243,338 B1
DATED : June 5, 2001
INVENTOR(S) : Norichika Mine

It is certified that error appears in the above-identified patent and that said Letters Patent is hereby corrected as shown below:

Column 3,
Line 30, change "advantage" to -- advantages --;
Line 41, after "is", insert -- a --.

Column 6,
Line 59, change "96" to -- Ninety-six --.

Column 7,
Line 15, first occurrence, change "of" to -- of, --; and
change "example" to -- example, --.

Column 8,
Line 23, delete "state";
Line 60, change "command." to -- command --.

Column 10,
Line 46, change "countermeasures" to -- countermeasure --;
Line 50, change "WBBMS" to -- WBBMs --;
Line 61, change "bloc" to -- block --.

Column 11,
Line 7, change "whether" to -- the --;
Line 14, change "14A." to -- 14A, --;
Lines 25 and 27, delete "state";
Line 67, change ""0"" to -- "0", --.

Column 12,
Line 1, change "to," to -- to --;
Line 67, change "record" to -- recorded --.

Column 14,
Line 2, after "of", insert -- a --.

UNITED STATES PATENT AND TRADEMARK OFFICE
CERTIFICATE OF CORRECTION

PATENT NO. : 6,243,338 B1
DATED : June 5, 2001
INVENTOR(S) : Norichika Mine

It is certified that error appears in the above-identified patent and that said Letters Patent is hereby corrected as shown below:

<u>Column 16,</u>
Line 42, change "tie" to -- the --.

Signed and Sealed this

Sixteenth Day of April, 2002

Attest:

JAMES E. ROGAN
Attesting Officer
Director of the United States Patent and Trademark Office